United States Patent [19]
Caza

[11] Patent Number: 6,079,508
[45] Date of Patent: Jun. 27, 2000

[54] ULTRASONIC PROCESSORS

[75] Inventor: Stanley George Caza, Liverpool, United Kingdom

[73] Assignee: Advanced Assured Homes 17 Public Limited Company, Onchan, United Kingdom

[21] Appl. No.: 08/981,694

[22] PCT Filed: Oct. 16, 1996

[86] PCT No.: PCT/GB96/01612

§ 371 Date: Sep. 4, 1998

§ 102(e) Date: Sep. 4, 1998

[87] PCT Pub. No.: WO97/02088

PCT Pub. Date: Jan. 23, 1997

[30] Foreign Application Priority Data

Jul. 5, 1995 [GB] United Kingdom ................... 9513659

[51] Int. Cl.⁷ .................................................. E21B 41/00
[52] U.S. Cl. .............................. 175/66; 175/88; 175/206; 175/207; 73/587; 73/594; 73/648
[58] Field of Search .................................. 175/58, 60, 65, 175/66, 88, 206, 207; 73/587, 594, 648

[56] References Cited

U.S. PATENT DOCUMENTS

| | | | |
|---|---|---|---|
| 4,015,319 | 4/1977 | Levine | 310/326 X |
| 4,081,889 | 4/1978 | Levine | 310/327 X |
| 4,163,917 | 8/1979 | Levine | 310/327 |

FOREIGN PATENT DOCUMENTS

| | | |
|---|---|---|
| 3728201 A1 | 3/1989 | Germany . |
| 1-014142 | 1/1989 | Japan . |
| 8500665 | 10/1986 | Netherlands . |
| 91/11543 | 8/1991 | WIPO . |

*Primary Examiner*—Roger Schoeppel
*Attorney, Agent, or Firm*—Townsend & Townsend & Crew

[57] ABSTRACT

The present invention provides an ultrasonic processor for the treatment, for example, dispersing, emulsifying, dissolving, mixing or deagglomerating of materials by the application of ultrasound thereto, wherein said ultrasonic processor comprises a hollow elongate enclosure member with a plurality of transducers fixed to the exterior of said elongate enclosure member along the length thereof; each said transducer being capable of applying ultrasonic waves to materials passing through the interior of said hollow elongate enclosure member; and control means for control and/or regulating the frequency of such ultrasonic waves produced by said transducers; and sensing means for the determination of the nature of the materials passing through the interior of said hollow elongate enclosure member, wherein said sensing means actuates said transducers to produce ultrasonic waves at the prescribed frequency in accordance with the nature of said materials to be treated. Furthermore, the present invention provides apparatus and methods for the separation of oil from drill cuttings and the separation of contaminants from soil materials.

19 Claims, 5 Drawing Sheets

ULTRASONIC PROCESSORS

The present invention relates to improvements in or relating to ultrasonic processors for the treatment, for example, dispersing, emulsifying, dissolving, mixing or deagglomerating of materials. In particular, the present invention relates to an ultrasonic processor capable of large scale treatment, for example, dispersing, emulsifying, dissolving, mixing or deagglomerating of materials by the application of ultrasonic waves thereto.

Intense ultrasonic waves travelling through liquids generate small cavities that enlarge and then implode, creating tremendous heat. This phenomenon named "cavitation" provides an unusual chemical environment and process conditions which are quite unique.

Cavitation makes available a range of energies on time scales that are not available from other sources. When cavitation is induced in a liquid by applying sound waves thereto, alternating regions of compression and expansion are created. The resulting micron size bubbles implode violently in less than a microsecond, heating their contents to approximately 5500° C. However, the surrounding liquid remains at ambient temperature due to the localisation of the temperature increase as "hotspots", which rapidly dissipate and cool.

In the case of solid particles in a carrier medium, at the point of implosion, as a result of the passing of the sound waves through the medium, the solid particles clash at speeds of up to 500 KMs per hour. This can result in a series of phenomenas ranging from the actual melting together of metals, to "clean" separation of solids from liquids due to the inherent aggression exhibited by such a process.

Realising the need to harness such useful unique ultrasound energies produced by cavitation, many types of apparatus capable of inducing cavitation have been developed.

In this connection, this led to the development of ultrasonic processors, capable of inducing such cavitation, comprising an enclosure member with transducers affixed thereon. However, due to the physical limitations of such ultrasonic processors, they could only be used for the treatment of materials on a small scale and accordingly, were not capable of large scale industrial application. For example, since the high powered transducers had a very short range of action, consequently, the walls of such enclosure member were required to be as close together as possible, in this connection, it was preferable that the width of such enclosure member was 25 mm or less. Therefore, the size of the materials which were to be treated by such ultrasonic processors had to be relatively small. Hence, the practical application, having regard to the particle size of the materials to be treated, of such ultrasonic processors was limited.

Furthermore, such closely spaced walls of such enclosure member were also required to be as thin as possible for efficient transmission of the ultrasonic waves. In this connection, such ultrasonic processors could not be used in situ, since there was always the risk that due to constant exposure of such walls to such ultrasonic waves, such walls could rupture resulting in the escape of the materials being treated, which, in some instances may be toxic or flammable and accordingly, may have adverse affects on the surrounding area, as well as placing life in the surrounding area at risk.

It is an object of the present invention to provide an ultrasonic processor which can at least minimise the disadvantages outlined above. Moreover, such ultrasonic processor is capable of large scale industrial application and can be erected in situ. For example, over recent years much attention has been focused on the potential for pollution, caused to the natural habitat in the vicinity of oil and gas rigs. In particular, the discharge of drilling muds and drilling by-products is now thought to have an accumulative and harmful effect on the surrounding marine life. In this connection, the ultrasonic processor of the present invention, described below, may be used in combination with other apparatus for the washing, separation, and collection of materials subsequently to be treated. Such separation can also result in the collection and re-use of the drilling mud components, for example hydrocarbon or synthetic oil, and the bentonite/barytes of the mud formulation. Moreover, such separation apparatus could be constructed on an oil rig, since due to the physical qualities of the ultrasonic processor of the present invention, it is unlikely that same will rupture resulting in the release of highly inflammable materials.

According to an aspect of the present invention there is provided an ultrasonic processor for the treatment, for example, dispersing, emulsifying, dissolving, mixing or deagglomerating of materials by the application of ultrasound thereto, wherein said ultrasonic processor comprises a hollow elongate enclosure member with a plurality of transducers affixed to the exterior of said elongate enclosure member along the length thereof; each said transducer being capable of applying ultrasonic waves to materials passing through the interior of said hollow elongate enclosure member; and control means for controlling and\or regulating the frequency of such ultrasonic waves produced by said transducers; and sensing means for the determination of the nature of the materials passing through the interior of said hollow elongate enclosure member, wherein said sensing means actuate said transducers to produce ultrasonic waves at the prescribed frequency in accordance with the nature of said materials to be treated.

In a preferred embodiment, such hollow elongate enclosure member is circular in cross-section. However, it is to be understood that such hollow elongate enclosure member may be rectangular, square, flat or any other suitable shape in cross section.

Further preferably, such hollow elongate enclosure member is constructed from stainless steel. However, it is to be understood that other types of suitable metals or materials of the required strength may also be used, for example, Hastealloy.

Further preferably, the hollow elongate enclosure member has a diameter of between 1 (2.54 cm) and 10 (25.4 cm) inches depending on the materials to be treated.

Also preferably, the transducers are arranged in pairs, diametrically opposite one another, or, in the case of an enclosure member of sufficiently large diameter, the transducers may be arranged in multiples to accommodate that surface area which is available on the external diameter of the enclosure member.

Further preferably, each transducer may be mounted on saddle-like member to form a transducer assembly. A plurality of such transducer assemblies may be rigidly secured to the exterior of such hollow elongate enclosure member by an epoxy resin and additional securement may be effected by the use of retaining bolts, which pass through the center of a individual transducer assembly and are welded to such elongate enclosure member. Alternatively, a silver-solder or nickel brazing method for securing a transducer assembly to such elongate member may also be used. A suitable construction of the transducer is shown in GB Patent No. 2151435.

Further preferably, each transducer includes a piezoelectric crystal which resonate at 30 kHz to 50 kHz. Each transducer is resonated by an electronic generator with an output power of between 1 and 12 KW depending on the application. It is to be understood that magnetostrictive transducers or other types of transducers capable of the required output may also be used.

In a preferred embodiment, the elongate enclosure member will have flange mounts at opposite ends of the periphery thereof in order that the ultrasonic processor of the present invention may be attached to apparatus to assist in the separation and collection of the materials which have been treated. However, it is to be understood that any other attachment means can be utilised.

In a preferred embodiment, the elongate enclosure member, in use, may be disposed vertically, horizontally, diagonally, or for example in a multiple configuration as a serpentine, for maximum use of available space.

The ultrasound processor will preferably be capable of producing multiple frequencies over the range of 10 kHz to 100 kHz utilising a system of ultrasound generation incorporating frequency sweep and auto follow for high intensity and uniform cavitation in the materials being processed.

It has been observed that the ultrasonic processor of the present invention in combination with apparatus for the separation of oil well cuttings and drilling muds results in a clear two phase recovery of either stones and chippings etc. or clean re-usable minerals in the case of muds, and the oil phase can be further dewatered or treated.

The ultrasonic processor of the present invention has particular application in relation to the treatment of drill cuttings. Such cuttings produced during the drilling of a wellbore, in an earth formation below a body of water, are usually contaminated with oil. In this respect, in some jurisdictions, legislation dictates that before such drill cuttings may be returned to the body of water, they must have no more than 10% oil associated therewith. However, new legislation, proposed to be introduced by January 1997, dictates that the amount of oil associated with such drill cuttings on their return to the body of water must be no more than 1%. Consequently, in order to comply with the new legislation there is now the need to provide an apparatus and a method capable of reducing the size of said drill cuttings thereby exposing the internal oil bound surfaces of said drill cuttings so that they may be cleaned to give drill cuttings with no more than 1% oil associated therewith.

In accordance with another aspect of the present invention, there is provided apparatus for treating oil contaminated drill cuttings, such apparatus comprising a receiving container into which the drill cuttings are supplied, means for transmitting such drill cuttings to one or more ultrasonic processors for reducing the size of said cuttings, means for introducing one or more materials for removing oil from said cuttings and means for collecting cleaned drill cuttings, and preferably additionally including means for washing and separating such treated drill cuttings whereby reduced size drill cuttings of 60 microns or less are forwarded to a storage container and cuttings in excess of 60 microns are returned for further treatment.

In view of the fact that the apparatus for treating such drill cuttings will generally be located on an oil rig or like platform arrangement, it will be necessary for each processor to be totally encased and thereby comply with Zone 1 Certification for hazardous area use. In addition, the power source or generator for operating the ultrasonic processor, in accordance with the invention, will also generally be totally encased within a housing.

It is a further aspect of the present invention that the generator be so located in the housing that any heat generated during such power generation is dissipated through the housing, usually in the form of a metal box, in which case the housing acts as a heat sink. Utilisation of such arrangement enables such "box" and processor to pass the stringent requirements of Zone 1 hazardous operations.

The surface of each transducer in contact with the sonic processor tube is precision machined so that there are no air passages or surface imperfections between the tube and the surface of the transducer affixed thereto, thereby ensuring the maximum conversion of ultrasonic energy into the sonic processor tube. Preferably a suitable silver solder or nickel brazing method is utilised to secure each transducer to the tube. Such features are factors which increase longevity of the ultrasonic processor, and reduce the necessity for high maintenance and repair, which are a large factor for consideration especially when operating in offshore environments.

When such arrangement is utilised the drill cuttings can be reduced in size to less than 60 microns and, by suitable treatment with cleaning liquids, or so-called "mobilisers", drill cuttings having less than 1% oil thereon can be achieved. Regarding the cleaning liquids used, any suitable liquid which is known for removing oil can be utilised, preferred materials being orange oil, alkaline silicates, biodegradable solvents and/or surfactants.

Further in accordance with another aspect of the present invention there is provided a method for treating drill cuttings produced during the drilling of a wellbore, said cuttings being contaminated with oil, characterised in that said method comprises:

mixing said contaminated drill cuttings with one or more solvent or cleaning materials for removing oil therefrom, and possibly also adding a carrier liquid;

passing said mixture through one or more ultrasonic processes whereby the size of the drill cuttings are reduced;

wherein those particles of drill cuttings reduced to a size less than 60 microns and containing 1% or less of oil therein, are transferred to a storage tank and those cuttings of greater than 60 microns are returned for further treatment, the separated oil being recovered in a separate storage tank.

The so purified well cuttings can then be returned to the seabed since same do not require any further processing and comply with all purity requirements, as dictated by said pending legislation.

Also in a further aspect of the present invention there is provided a method for cleaning contaminated soil materials comprising the steps of:

mixing contaminated soil material with a cleaning solvent, and possibly a carrier liquid;

passing said mixture through at least one ultrasonic processor to reduce the size of the material and expose the internal surfaces of the soil, and collecting the decontaminated soil material.

In accordance with another aspect of the present invention, there is provided apparatus for cleaning contaminated soil material, such apparatus comprising a receiving container into which the contaminated soil materials are supplied, means for transmitting such contaminated soil materials to one or more ultrasonic processors for reducing the size of said contaminated soil materials, means for introducing one or more materials for removing contamination from said contaminated soil materials and means for collecting cleaned soil materials, and preferably additionally including means for separating such treated soil material.

Specific embodiments of the invention will now be described by way of example with reference to the accompanying drawings, in which.

Figures 1, 2:
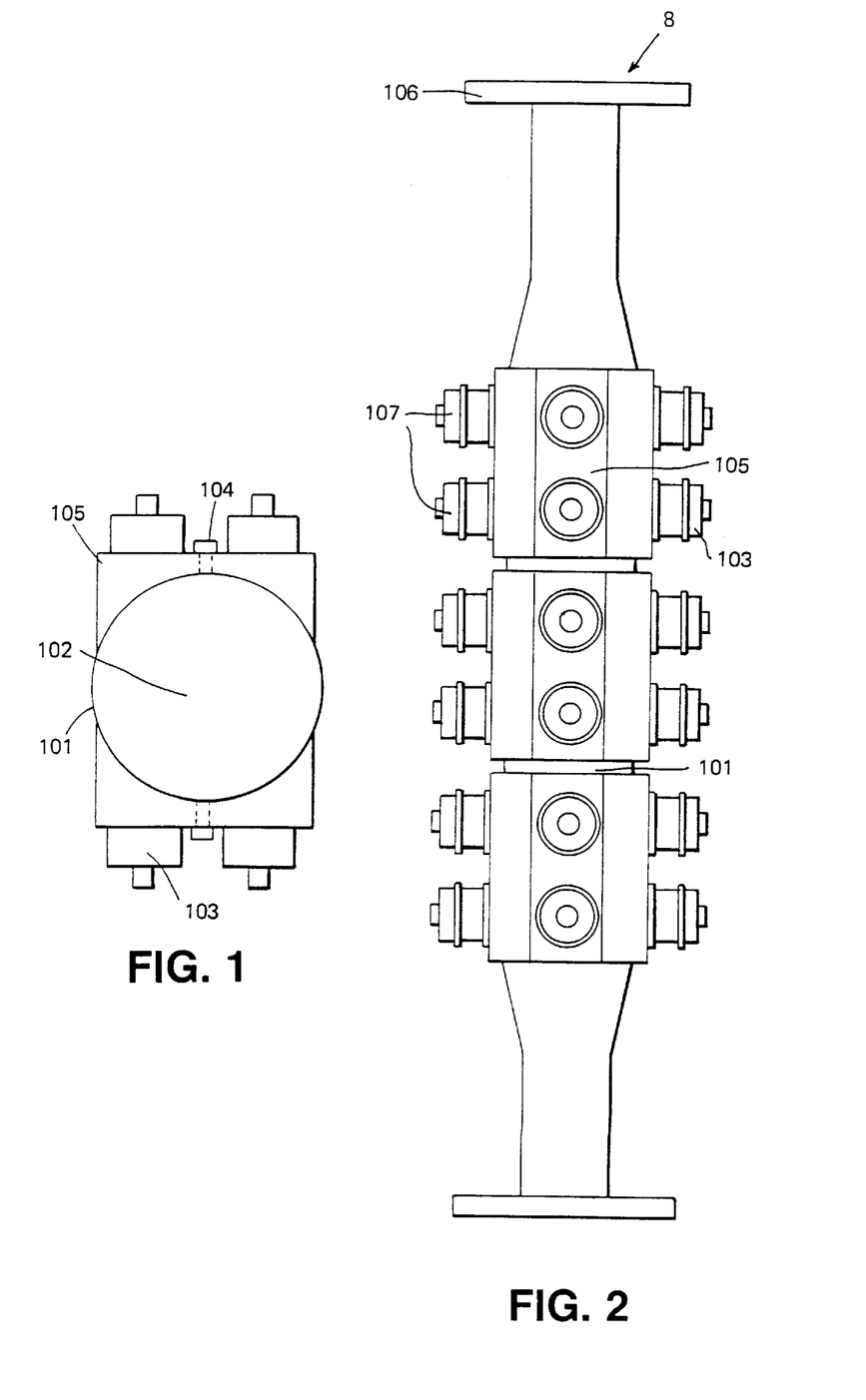
FIG. 1 shows a cross-section of an ultrasonic processor in accordance with the present invention.
FIG. 2 shows a plan view of such ultrasonic processor.
Figure 3:
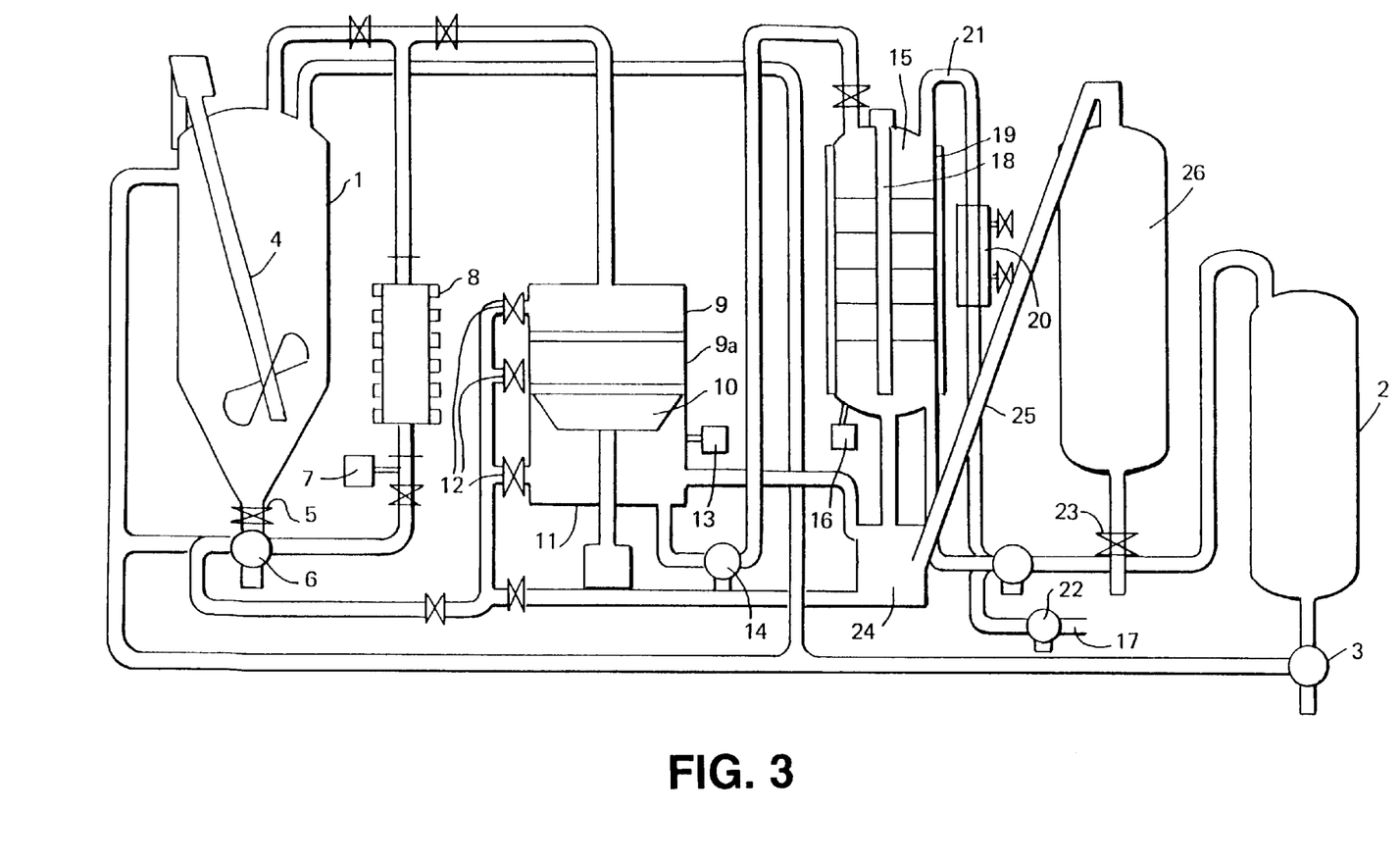
FIG. 3 shows a schematic representation of the present invention in combination with apparatus for the separation and collection of contaminated soil materials which are to be treated.

As illustrated, an ultrasonic processor 8 comprises a hollow elongate enclosure member 101 of circular cross-section made of stainless steel. Each transducer assembly 107 comprises a saddle-like member 105 having one or more transducers 103 mounted thereon. Each transducer 103 is capable of applying ultrasound to the interior 102 of the hollow elongate enclosure member 101. Each saddle-like member 105 is secured to the exterior of the elongate member 101 with an epoxy resin, securement being supplemented with a retaining bolt 104, passing through the centre of each transducer assembly 107, which are welded to the elongate member 101. In FIG. 2, flange mounts 106 are connected at opposite ends of the elongate member 101. As illustrated in FIG. 3, the flange mounts 106 of FIG. 2 enable the ultrasonic processor 8 of the present application to be used in combination with other apparatus, described below, for the separation and collection of materials which have been treated by such processor.

As shown in FIG. 3, contaminated soil material to be processed is introduced into a pre-mixing vessel 1, one or more solvents such as acetone, methylene chloride or any other type of solvent, or water, is added to the material from a solvent or aqueous storage vessels 2 and transferred to the pre-mixing vessel by an aqueous/solvent pump 3. As soon as a ratio of 1:1 or above is achieved, a chopper agitator 4 is activated to enable pre-mixing and breaking up of large agglomerates. Once correct consistency of the solution has been reached, a slide valve 5 is opened and a peristaltic pump 6 is started. When a pressure switch 7 indicates pressure, the ultrasonic processor 8 is switched on.

The material is then pumped through the processor where the resonating ultrasonic transducers affixed to the processor generate high frequency sound waves cavitation in the materials being processed; thus removing and freeing materials bonded to each other, or absorbed into each other, enabling separation after a suitable number of passes through the processor.

From the ultrasonic processor, the material passes over a vibrating 25 mm screen 9, then through a 1 mm screen 9a and finally through a 10 micron vibrating screen 10.

Such processed material is collected in a storage vehicle 11 under the vibrating screen system. All the materials from the surface of the vibro screens via the end shutes 12 is passed back into the suction of the peristaltic pump 6, and new aqueous solutions or solvents are then dosed into the materials stream, depending on the materials being processed.

Solvents or aqueous media is supplied via a solvent/aqueous pump 3. Material and solvent mixture are then pumped into the ultrasonic processor 8 and screens, as described above. This process is repeated until the desired requirements are met for the materials being processed.

Materials from the 10 micron screen are all collected in a storage vessel 11. Once there is enough volume as detected by a level switch 13 being covered, a distillation or filtration feed pump 14 is initiated transferring liquid into a solvent scraper or filtration system still 15 until a low level switch 13 is uncovered, which stops a transfer pump 14.

Once the operational level switch 13 in the scraper still 15 is covered a scraper agitator 18 is initiated which mixes the solvents and material prior to distillation. After a 15 minute time delay, a heater jacket 19 is initiated to raise the temperature within the scraper still 15 to the vapour phase temperature of the solvents being utilised in the process to enable recovery of solvents and separation of contamination, or recoverable material, for resale or disposal. The solvent vapour is condensed by a condenser 20 on a discharge vapour line 21.

This process of solvent extraction can be assisted by the use of a vacuum pump 22 if the material is found to be temperature sensitive or higher temperatures are required for extraction. The condensed solvent is recovered into a solvents recovery tank 2 for reuse in the process.

The contaminated or resalable materials once solvent extraction is completed, will be removed from a scraper still outlet valve 23. In the case of powdered materials, it will be transferred from a scraper still pump tank 24 via a flexible powder conveyor 25 into a powdered or sludge receiving tanks 26. In the case of liquids, in other words, oil or petrochem products, they will be pumped to the liquid or sludge recovery vessel 26 for resale or disposal. Once the ultrasonic processor has broken down the contamination, the following will happen: in the case of water-based carrying medium, the oil and contamination will be separated by conventional filtration such as sedimentation, centrifuge or cyclone methods; in the case of water, membrane systems for ultrafiltration will be used.

Figure 4:
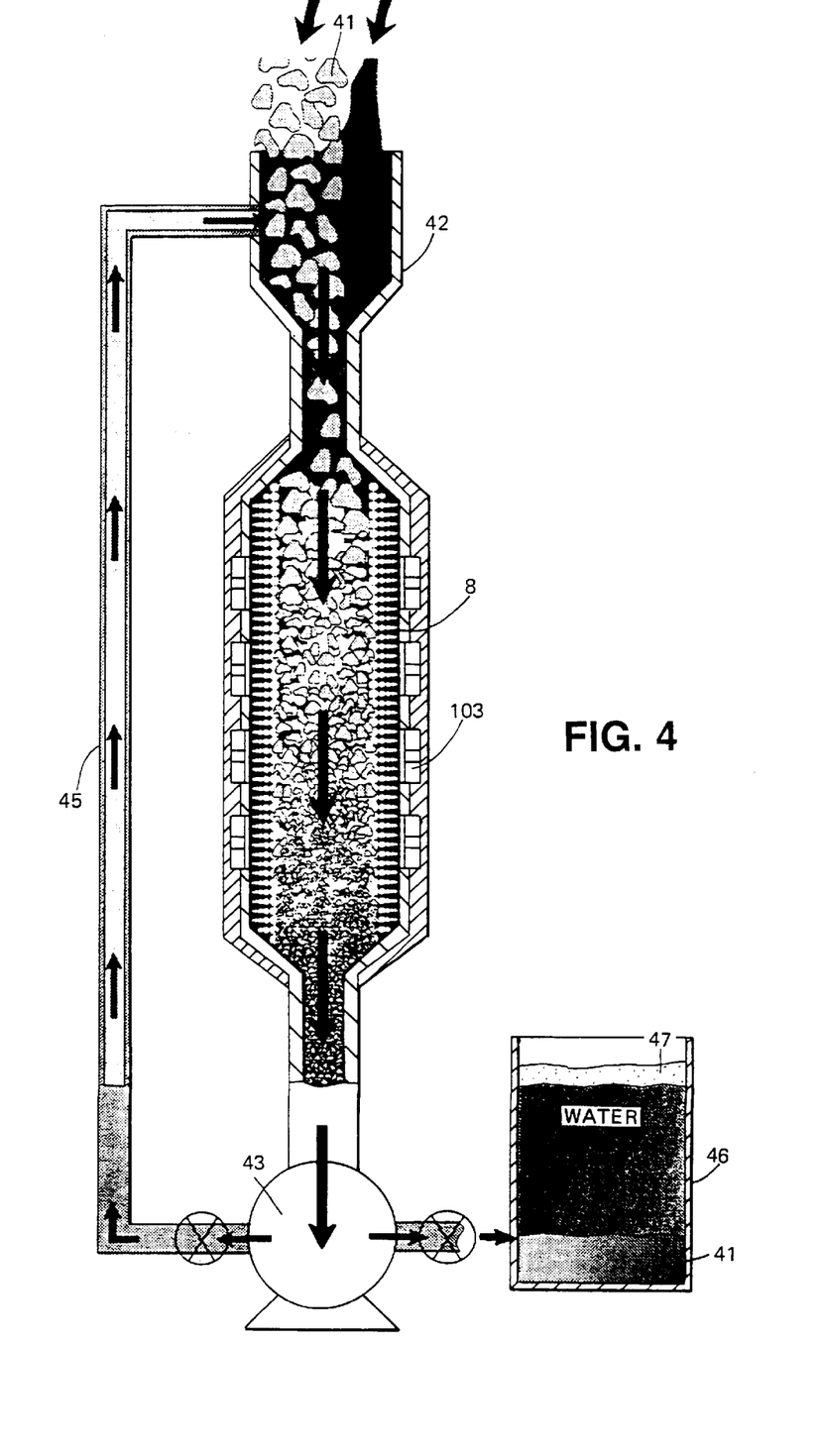
FIG. 4 is a schematic view of an arrangement for use in treatment of drill cuttings.

As illustrated in FIG. 4, drill cuttings 41 are introduced into a mixing vessel 42. Said mixing vessel 42 enables the drill cuttings 41 to be mixed with a suitable cleaning material or solvent, for example, orange oil, together with a carrier liquid, such as sea water. The mixture is then passed through an ultrasonic processor 8 wherein the cuttings 41 are reduced in size, preferably to a size of less than 60 microns. Any cuttings 41 larger than 60 microns are returned to the mixing vessel 42 via pump 43. In this connection, a separator (not illustrated), for example, a hydrocyclone separates the cuttings emanating from the ultrasonic processor 8 such that cuttings 41 of greater size than 60 microns are returned to the mixing vessel 42, for further processing via conduit 45, and cuttings 41 which are less than 60 microns are collected in collecting vessel 46. The material is then subjected to a wash and separation stage, whereby the cleaned solids are separated from the oil and water, and the oil is further separated from the water phase. The treated cuttings are returned to the sea bed, the oil recovered for re-use, and the water pumped back to the mixing vessel 42 to commence another cycle.

It is to be understood that the oil cuttings are generally added to the slurry tank in an amount of approximately 25 tons per hour, continuously, and therefore, the apparatus utilised must be able to continuously treat the drill cuttings and reduce same to the required size, whilst at the same time removing oil therefrom.

It can thus be seen that the method of the present invention when applied to treatment of drill cuttings results in a substantial saving in time and expense. Heretofore, it had been necessary for the drill cuttings to be transferred to a ship and then taken ashore for further treatment to remove the oil therefrom. Alternatively, a process has been utilised wherein the cuttings are returned to the sub-structure from where they were originally obtained through the drill housing; however, this procedure has the disadvantage that the drill cuttings are not of the regulation purity required in the near future and therefore, such cuttings have to be returned to the original sub-structure which means that the hole originally drilled cannot be utilised again. Furthermore the control of particle size by standard methods such as pump shear or ball mills, finds difficulty to result in a uniform fluidity.

Figure 5A:
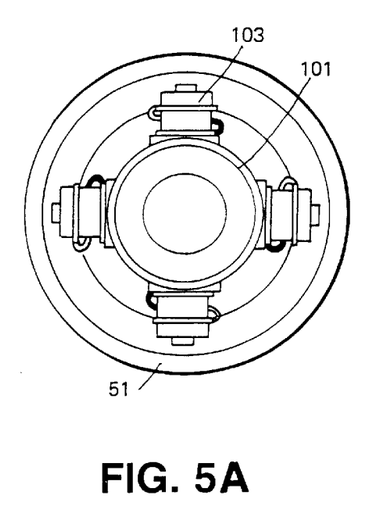
FIGS. 5A and 5B schematically indicate the form of ultrasonic processor preferably utilised in the treatment of drill cuttings.
Figure 5B:
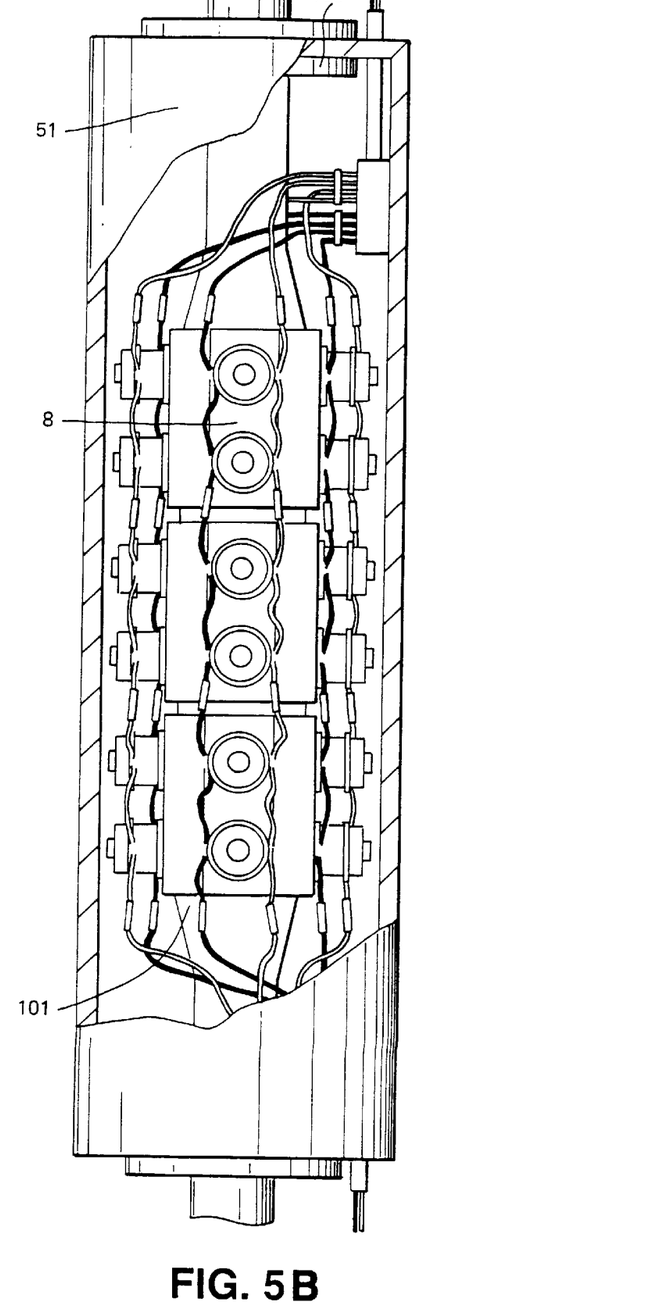

As illustrated in FIG. 5B, the processor 8 is encased within a metal housing 51 in order to comply with Zone 1 certification for hazardous area use. Furthermore, and as illustrated in FIG. 5A, the transducers 103 are integral with the elongate enclosure member 101. This critical design enables conformity with such requirements as the avoidance of flame creep in a hazardous area where gas or solvent vapour may be present.

Figure 6:
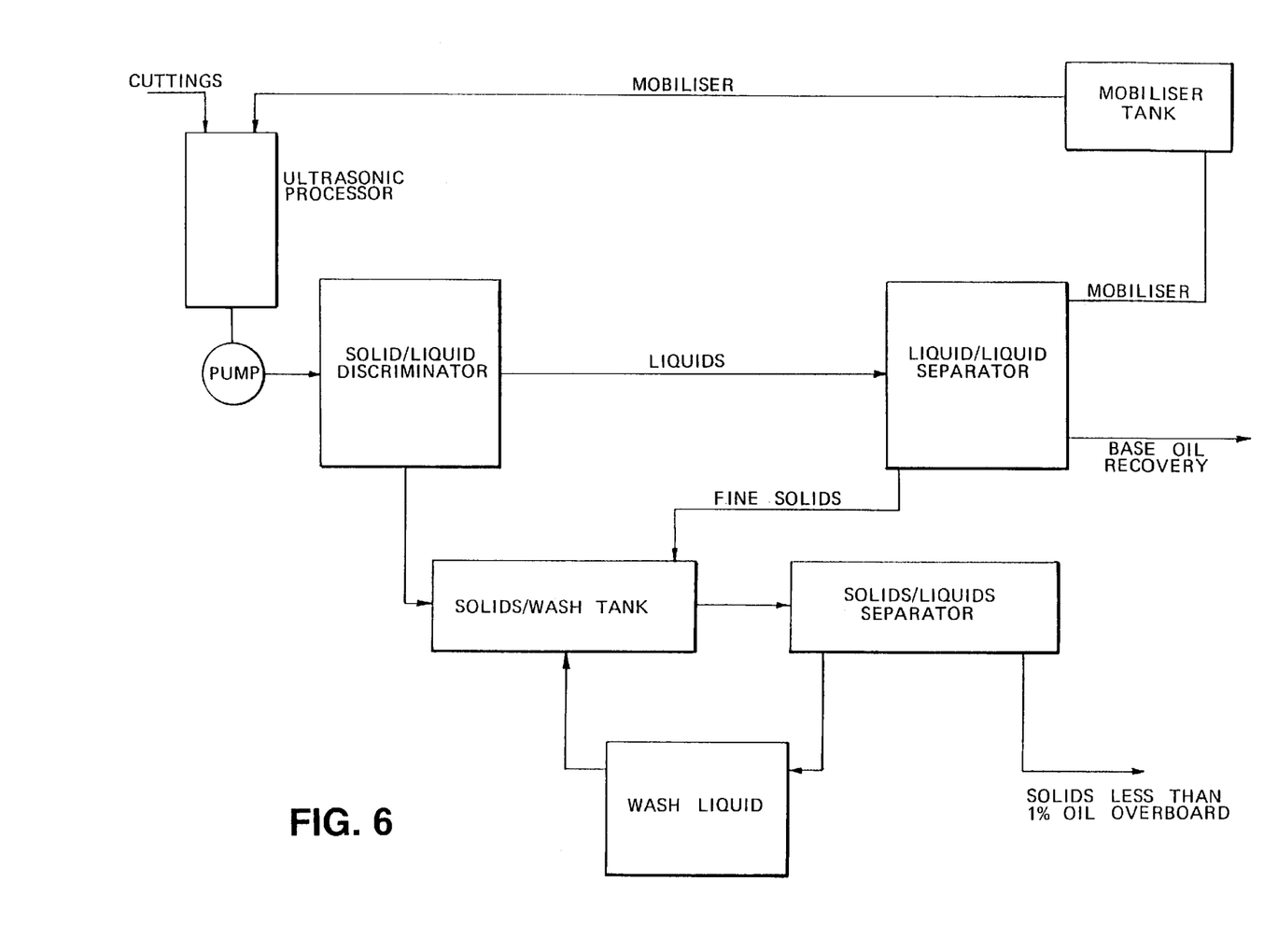
FIG. 6 is a schematic representation of a drill cuttings cleaning system in accordance with the present invention.

As illustrated in FIG. 6 oil contaminated cuttings and a mobiliser, from a mobiliser tank, are passed into and through the ultrasonic processor. A pump then pumps the mixture to a solid/liquid discriminator. The liquids are then separated by a liquid/liquid separator such that the mobiliser is returned to the mobiliser tank and the oil is collected in a recovery tank. Any remaining fine solids are passed to a solids/wash tank, together with any solids separated from the liquids by the solid/liquid discriminator. Said solids are then washed and transferred to a solid/liquids separator. Solids comprising less than 1% oil associated therewith are returned to the seabed, whereas the separated liquids are washed and then returned to the solids wash tank.

The ultrasonic processor(s) utilised in the present invention enables materials treated thereby to be reduced to micron or sub micron size depending upon the intent of the application. For the purposes of treatment of oil well cuttings, a size of less than 60 microns and a purity of 1% or less of oil complies with all official requirements. In the case of treatment of dyestuffs, it is generally required that the ultrasonic processor reduces the dye particles to sub micron size.

The construction of the ultrasonic processor and the integers constituting same will be selected according to the particular application required. Depending upon the amount of material to be treated, the number of ultrasonic processes can be increased as necessary. Moreover, the size of the processing tube and the number of transducers located therearound will depend upon the intended application.

Furthermore, although the present invention has been illustrated as having a plurality of transducer assemblies, diametrically opposite one another, rigidly secured to the hollow elongate enclosure member, it is to be understood that singular transducers secured to one side of an enclosure member may be sufficient depending on the nature of the material to be treated.

Whilst the present invention has been generally illustrated in relation to the separation of drill cuttings and contamination from soil materials, it is to be understood that the ultrasonic processor of the present invention is capable of a number of other useful practical applications including formulation of drilling muds, polymer shearing, scale and wax deposit break-up, solids disintegration to expose trapped precious metals or stones, restitution of process chemicals for re-use, oxide/contamination removal from catalysts, dyestuff size reduction and deagglomeration.

What is claimed is:

1. An ultrasonic processor for the treatment of materials by the application of ultrasound thereto, comprising:
   a tubular member (101) of substantially circular cross-section having an outer surface;
   a plurality of transducers (103) attached to the outer surface of the tubular member (101), each of said transducers being capable of applying ultrasonic waves to the interior (102) of the tubular member (101);
   attachment means (105) for attaching said transducers (103) to the outer surface of the tubular member (101), the attachment means (105) having a curved surface which corresponds to the outer surface of the tubular member (101); and
   means for controlling and regulating the frequency of the ultrasonic waves produced by said transducers (103).

2. An ultrasonic processor as claimed in claim 1, wherein the attachment means comprises at least one saddle-like member (105) which is adapted to receive at least one of said transducers (103).

3. An ultrasonic processor as claimed in claim 1, wherein the transducers (103) are arranged on the outer surface of the tubular member (101) in sets wherein each set comprises a number of transducers (103) arranged at the same height around the circumference of the tubular member (101).

4. An ultrasonic processor as claimed in claim 1, wherein the ultrasonic processor (8) is housed within a housing member (51).

5. An ultrasonic processor as claimed in claim 1, wherein the tubular member (101) has a diameter of between 2.54 cm and 25.4 cm.

6. An ultrasonic processor as claimed in claim 1, wherein the attachment member (105) is attached to the outer surface of the tubular member (101) by at least one of epoxy resin, silver soldering, and nickel brazing.

7. An ultrasonic processor as claimed in claim 6, wherein additional securement of the attachment member (105) to the outer surface of the tubular member (101) is effected by the use of retaining means (104) passing through the center of a transducer assembly (107) and are welded to the outer surface of the tubular member (101).

8. An ultrasonic processor as claimed in claim 1, wherein each transducer (103) includes a piezoelectric crystal which resonates at 30 kHz to 50 kHz and wherein each transducer (103) is resonated by an electric generator with an output power of between 1 and 12 kw.

9. An ultrasonic processor as claimed in claim 1, wherein the tubular member (101) has flange mounts (106) at opposite ends of the periphery thereof in order that the ultrasonic processor may be attached to additional apparatus to assist in the separation and collection of materials to be treated.

10. An ultrasonic processor as claimed in claim 1, wherein in use, the tubular member (101) is disposed in a position selected from the group consisting of vertical position, horizontal position, diagonal position and serpentine position.

11. An ultrasonic processor as claimed in claim 1, wherein the ultrasonic processor is capable of producing multiple frequencies in the range of 10 kHz to 100 kHz utilising a system of ultrasound generation, incorporating frequency sweep and auto-follow for high intensity and uniform cavitation in the materials being processed.

12. An apparatus for treating oil contaminated drill cuttings (41), such apparatus comprising a receiving container (42) into which the contaminated drill cuttings (41) are supplied, means for transmitting such drill cuttings to one or more ultrasonic processors (8) as claimed in claim 1 for reducing the size of said cuttings (41), means for introducing one or more materials for removing oil from said cuttings and means (46) for collecting cleaned drill cuttings.

13. An apparatus as claimed in claim 12, further including means (46) for washing and separating such treated drill cuttings whereby reduced size drill cuttings of 60 microns or less are forwarded to a storage container and cuttings in excess of 60 microns are returned for further treatment.

14. A method for treating drill cuttings produced during the drilling of a well bore, said cuttings being contaminated with oil, characterized in that said method comprises:

mixing said contaminated drill cuttings with at least one material for removing oil therefrom, said material being selected from the group consisting of solvents and cleaning materials;

passing said mixture through one or more ultrasonic processes as claimed in claim 1, whereby the size of the drill cuttings are reduced;

wherein those particles of drill cuttings reduced to a size less than 60 microns and containing 1% or less of oil therein, are transferred to a storage tank and those cuttings of greater than 60 microns are returned for further treatment, the separated oil being recovered in a separate storage tank.

15. The method of claim 14, wherein a carrier liquid is also included in said mixing step.

16. An apparatus for cleaning contaminated soil materials, such apparatus comprising a receiving container into which the contaminated soil materials are supplied, means for transmitting such contaminated soil materials to one or more ultrasonic processors as claimed in claim 1 for reducing the size of said contaminated soil materials, means for introducing one or more materials for removing contamination from said contaminated soil materials and means for collecting cleaned soil materials.

17. An apparatus as claimed in claim 16, further including means for separating such cleaned soil materials from contaminated soil materials.

18. A method for cleaning contaminated soil materials comprising the steps of:

mixing contaminated soil material with a cleaning solvent;

passing said mixture through at least one ultrasonic processor as claimed in claim 1 to reduce the size of the material and expose the internal surfaces of the soil; and collecting the decontaminated soil material.

19. The method of claim 18, wherein a carrier liquid is also included in said mixing step.

* * * * *